No. 688,333. Patented Dec. 10, 1901.
R. PORTER.
WIRE FENCE TOOL.
(Application filed Feb. 4, 1901.)
(No Model.)

Witnesses
J. Edmunds
M. Braund

Inventor
Robert Porter
By P.J. Edmunds
Attorney

THE NORRIS PETERS CO., PHOTO-LITHO., WASHINGTON, D. C.

UNITED STATES PATENT OFFICE.

ROBERT PORTER, OF RAVENSWOOD, CANADA.

WIRE-FENCE TOOL.

SPECIFICATION forming part of Letters Patent No. 688,333, dated December 10, 1901.

Application filed February 4, 1901. Serial No. 46,020. (No model.)

*To all whom it may concern:*

Be it known that I, ROBERT PORTER, a subject of the King of Great Britain, and a resident of Ravenswood, in the county of Lambton, in the Province of Ontario, Canada, have invented a new and useful Combined Wire-Fence Weaver, Wire-Splicer, and Steel-Stay Fastener, of which the following is a specification.

This invention relates to a tool or implement by which one wire may be twisted around another, the object being to provide a new and useful tool or implement by which one wire may be readily, easily, and tightly and firmly twisted around another, and which is particularly adapted for weaving with a horizontal fence-wire another wire at an angle thereto, and for tightly twisting the adjoining ends of two fence-wires around one another to unite or splice them together, and to tightly twist a wire around a steel stay-rod and a horizontal fence-wire, in order to firmly secure and hold them together, and at the same time provide a simple, strong, durable, inexpensive, and efficient device for this purpose.

Reference is had to the accompanying drawings, wherein—

Figure 1:
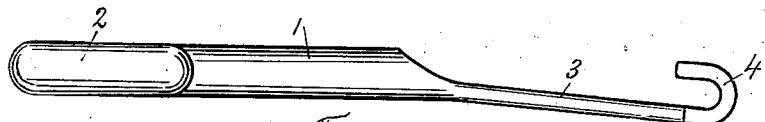
Figure 2:
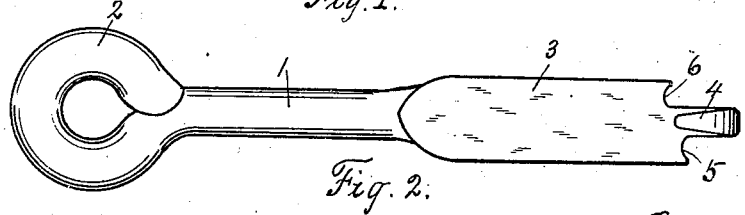
Figure 4:
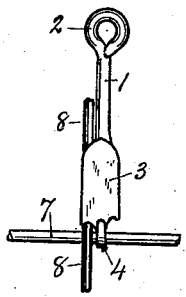
Figure 5:
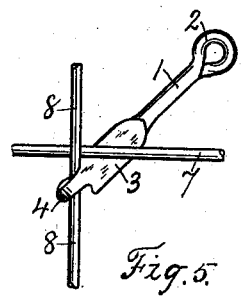
Figure 6:
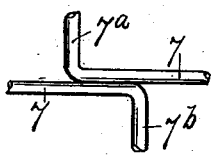
Figure 3:
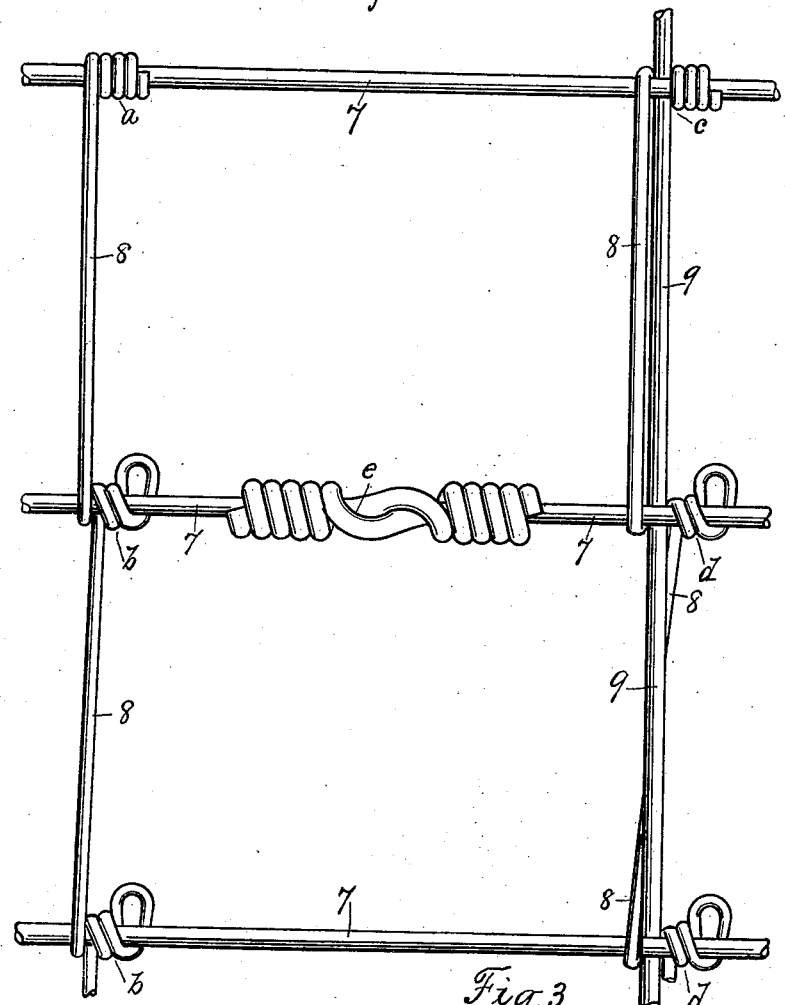

Figure 1 is a side elevation of a tool or implement embodying my invention. Fig. 2 is a plan view of same. Fig. 3 is a small section of a fence, showing the wires after being twisted or woven one with the other by this tool or implement. Figs. 4 and 5 show the engagement of this tool or implement with the fence-wires when weaving or twisting one wire around the other. Fig. 6 is a view of the adjacent ends of two fence-wires, showing their shape and position before being bent or spliced together.

The numeral 1 designates the shank or body of the tool or implement; 2, an eye formed on one end thereof; 3, a flat portion; 4, a hook on the opposite end, and 5 and 6 shoulders on opposite sides of the tool and at different distances from the hooked end. The shank or body 1 and the eye 2 are formed round, in order to be grasped by the hand with ease, and the portion 3 is formed flat to provide a wide bearing for the tool at the point where it rests on the intermediate horizontal fence-wires 7 when weaving or twisting the vertical fence-wires 8 around said horizontal fence-wires. This steadies the tool, prevents it from twisting in the hand, and renders the operation of this tool light and easy. The hook 4 pivotally engages the tool or implement with the top horizontal fence-wire 7 when twisting the vertical wire around said top wire; but said hook 4 engages with the vertical wire 8 when twisting it around the intermediate or bottom horizontal fence-wires. In the case of twisting and weaving the vertical wire around the intermediate or bottom horizontal fence-wires the wide flat portion 3 of the tool rests on said horizontal fence-wires. This provides a wide flat bearing 3 for the tool, by which it is steadied and prevented from turning in the hand, as before described. The shoulders 5 and 6 are at different distances from the hooked end 4, in order to adapt the same tool or implement to firmly grasp and weave or twist large or small wire, and the eye 2 provides a convenient means by which the tool or implement may be hung up or slung from the hand.

The operation is as follows: In order to tightly and firmly weave or twist a weaving, stay, or vertical fence-wire 8 around the top horizontal fence-wire 7, place said wire 8 against said wire 7, so that the end of the former will project above the latter, as shown in Fig. 4. Then hook the weaving-tool onto top wire by hook 4, with the short shoulder 5 against or on the weaving-wire 8, and turn said weaving tool and wire 8 two, three, or more times over the horizontal fence-wire 7. This will twist or weave and thereby tightly and firmly secure the weaving-wire 8 with the horizontal fence-wire 7, as shown at *a*, Fig. 3. Then carry weaving-wire 8 down to the second or next horizontal fence-wire 7. Then hook the weaving-tool onto said weaving-wire 8 by hook 4 underneath the horizontal wire 7 and with the handle-shank 1 away from you, as shown in Fig. 5. Then rest the flat portion 3 of the tool against the horizontal fence-wire 7 and turn said tool, together with the weaving-wire 8, twice around the horizontal fence-wire 7. This will weave or twist the wire 8 around said second wire 7, as shown at *b* in Fig. 3, and so on to the bottom of the fence. Then cut off weaving-wire and commence at the top again, as before described.

To secure, insert, weave, or fasten steel stays 9 in the fence, place the weaving, stay, or vertical fence wire 8 against the horizontal fence-wire 7, as shown in Fig. 4, and turn said wire 8 around said wire 7 once. Then put the steel stay 9 on the opposite or back side of fence between weaving-wire 8 and horizontal wire 7, and then turn said wire 8 around said wire 7 two, three, or more times, as before stated. This will twist or weave, and thereby tightly and firmly secure the weaving-wire 8, the steel stay 9, and the horizontal fence-wire 7 together, as shown at c in Fig. 3. Then carry the weaving-wire 8 down to the second or next horizontal fence-wire 7. Then place the weaving-tool as before described for the second or next wire, with stay 9 between the tool and the horizontal fence-wire 7, and turn said tool, together with the weaving-wire 8, twice around the horizontal wire 7. This will twist or weave and tightly and firmly secure the weaving-wire 8, steel stay 9, and horizontal wire 7 together, as shown at d in Fig. 3, and so on to the bottom of the fence. Then cut off wire and commence at top again, as before described. To splice or join the adjacent ends of two fence-wires 7 together, bend the adjacent ends of said wires at right angles and then lap one over the other, all as shown in Fig. 6. Then firmly hold the wires where they lap over one another with a pair of pliers. Then engage the weaving-tool with the wire 7 by hook 4 and place the shoulder 5 against or on the angular portion 7$^a$ of the wire 7 and turn two, three, or more times. Then turn the other angular end 7$^b$ in the same manner, when the adjacent ends of the wires 7 will be readily, easily, and tightly and firmly spliced and secured together, as shown at e in Fig. 3. For twisting or weaving small fence-wire first engage the hook 4 with the horizontal fence-wire 7, and then place the short shoulder 5 on or against said small wire and turn the tool and said small wire over the horizontal wire 7, and for large fence-wire first engage the hook 4 with the horizontal fence-wire 7 and place the long shoulder 6 on or against said large wire. In this case it is preferable to turn the tool and large weaving-wire under instead of over the horizontal fence-wire 7.

As a result of this invention there is combined in one tool or implement a wire-fence weaver, a wire-splicer, and steel-stay fastener, and at the same time one that will be simple, strong, durable, inexpensive, and efficient in practical use for readily, easily, and tightly and firmly weaving, securing, or fastening one wire with another.

Having thus described my invention, I claim—

As a new article of manufacture, the herein-described wire-fence tool made of a single piece of metal comprising a shank or handle 1, a relatively wide flat portion 3 at the working end of the handle, a hook 4 projecting from the remote end of the flat portion and turned over in a plane at right angles to the greatest width of said portion, and shoulders at this end of the flat portion and at opposite sides of the shank of the hook, one shoulder being farther from the bend of the hook than the other, the whole for use as herein set forth.

In testimony whereof I have signed in the presence of the two undersigned witnesses.

ROBERT PORTER.

Witnesses:
WILLIAM LAWRIE,
ROBT. SCOTT.